United States Patent [19]

Norris

[11] E Re. 29,811

[45] Reissued Oct. 24, 1978

[54] DENTAL CHAIR AND ADJUSTABLE HEAD SUPPORT MECHANISM THEREFOR

[76] Inventor: Floyd E. Norris, 16350 130th Ave. Southeast, Renton, Wash. 98055

[21] Appl. No.: 757,328

[22] Filed: Jan. 6, 1977

Related U.S. Patent Documents

Reissue of:

[64] Patent No.: 3,858,937
Issued: Jan. 7, 1975
Appl. No.: 361,591
Filed: May 18, 1973

[51] Int. Cl.[2] ..... A47C 1/10

[52] U.S. Cl. ..... 297/408; 297/284; 297/421; 297/46 D

[58] Field of Search ..... 297/284, 353, 418, 460, 297/391; 399, 405, 407–410, 421, 422

[56] References Cited

U.S. PATENT DOCUMENTS

| | | | |
|---|---|---|---|
| 3,197,255 | 7/1965 | Caudill | 297/460 |
| 3,603,642 | 7/1971 | Laessker | 297/408 |
| 3,627,379 | 12/1971 | Faust | 297/391 |
| 3,719,388 | 3/1973 | Fortnan | 297/410 |
| 3,729,227 | 4/1973 | Ohta | 297/391 |
| 3,773,382 | 11/1973 | Corsault et al. | 297/284 |
| 3,924,894 | 12/1975 | Rabiivowitz et al. | 297/460 |

*Primary Examiner*—James C. Mitchell
*Attorney, Agent, or Firm*—Dowrey & Cross

[57] ABSTRACT

A dental chair is disclosed which has an adjustable headrest incorporating a flush mounted adjustment mechanism allowing (1) adjustment about a central pivot, (2) vertical adjustment or (3) forward and rear adjustment. The dental chair also incorporates deflectable "wing" portions adjacent each of the arm supports which do not need adjustment and which allow the dentist more ready access to the patient.

8 Claims, 5 Drawing Figures

FIG. 1
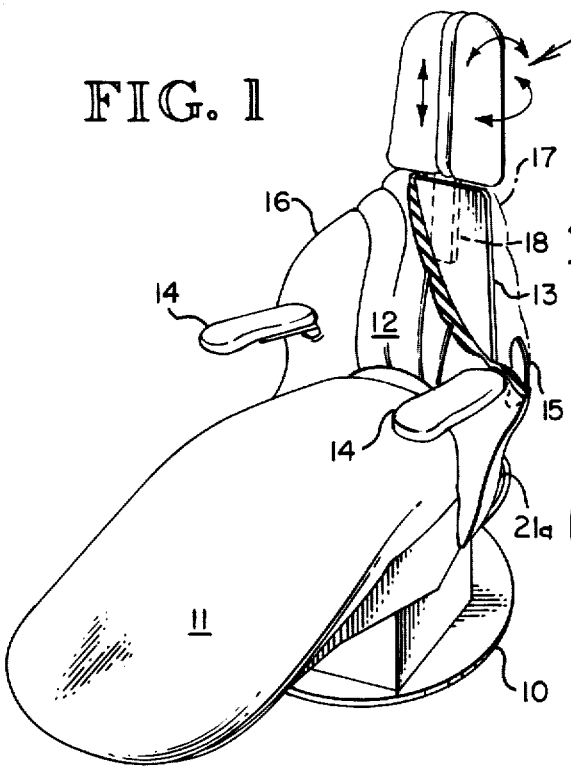
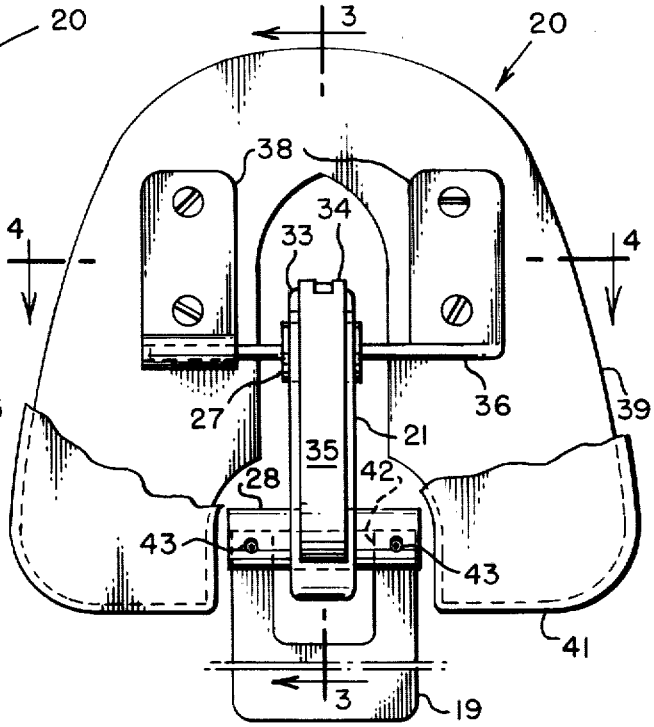
FIG. 2
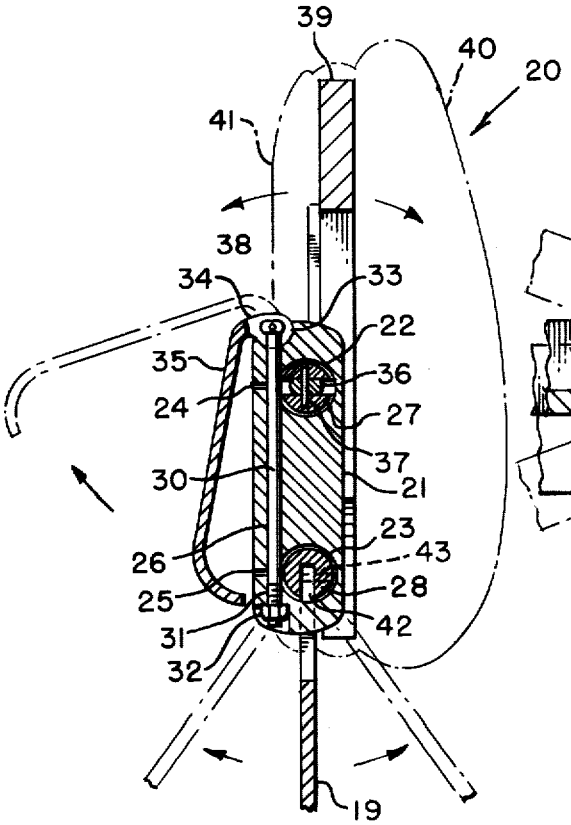
FIG. 3
FIG. 4
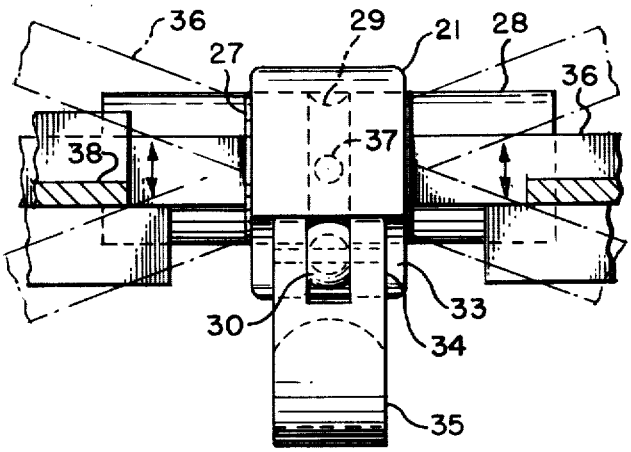
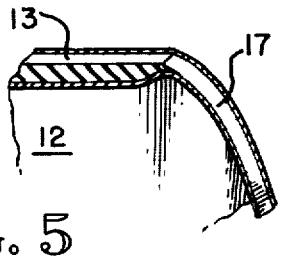
FIG. 5

DENTAL CHAIR AND ADJUSTABLE HEAD SUPPORT MECHANISM THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a dental chair and an improved adjustment mechanism for the headrest of the chair.

2. Prior Art Relating to the Disclosure

Many of the chairs used by dentists and other professionals have adjustable headrest assemblies which are expensive to fabricate, cumbersome, inadequately adjustable and annoying to operate. It is also conventional for dental chairs to incorporate arm slings extending from the top of the back support of the chair to the arm supports, which keep the patient's arms and hands close to the body, out of the way of the technician or professional. The slings are always slipping loose and needing adjustment.

SUMMARY OF THE INVENTION

This invention relates to a dental chair incorporating an adjustable headrest which is vertically adjustable, adjustable about a central pivot point and adjustable both forward and rearward. The adjustable headrest comprises a support connecting to the back support of the chair at one end and to the adjustment mechanism at the opposite end. A padded headrest includes means connecting it with the adjustment mechanism. The adjustment mechanism includes: (1) an elongated linking member having upper and lower, variable size jaw openings therein receiving the connecting means of the support and the headrest; (2) a pin extending through the linking member holding the connecting means in place; and (3) means secured to the pin at one end contacting a camming surface on the linking member for contracting the jaw openings about the connecting means, preventing their movement.

The invention is also directed to a dental chair including integral, deflectable "wing" portions extending between the arm support and the top of the back support which (1) are flexible, (2) allow the dentist or technician to work closer to the patient, if desired, and (3) do not need adjustment.

The objects of this invention are: (1) to provide an improved adjustment mechanism for the headrest of a chair which is relatively inexpensive to manufacture, easy to operate and flush mounted to prevent interference with the dentist or technician and for design purposes; (2) to provide a dental chair incorporating an improved, flush mounted adjustment mechanism for a headrest; (3) to provide a dental chair incorporating flexible, deflectable wing portions which do not need adjustment and which allow the operator closer access to the patient sitting in the chair; and (4) to provide a dental chair having a back support hinged to the lower body support forward of the terminating edge of the lower body support, the back support having a curved, barrel-like appearance.

BRIEF DESCRIPTION OF THE DRAWINGS

FIG. 1 is a perspective view of the dental chair of the invention having a cut-away portion illustrating one of the flexible wings of the chair;

FIG. 2 is a rear elevational view of the headrest including the adjustment mechanism;

FIG. 3 is a vertical cross-sectional view along section line 3—3 of FIG. 2 illustrating the adjustment mechanism;

FIG. 4 is a horizontal cross-sectional view along section line 4—4 of FIG. 2; and FIG. 5 is a partial cross-sectional view of the flexible wing portion of the chair.

DETAILED DESCRIPTION OF THE INVENTION

FIG. 1 illustrates a perspective view of the dental chair of this invention having a lower floor support 10 a padded lower body support 11 secured to the floor support 10 and a padded, integral back support 12 hinged at 21a to the lower body support forward of the rear terminating edge of the lower body support 11. The frames of the lower body support 11 and back support 12 are fabricated from steel plating one-eighth inch to five-sixteenths inch thickness over which is placed padding as an outer decorative upholstery covering, such as leather, naugahyde or vinyl. The back support has arm supports 14 attached at each side. Each of the arm supports includes a rigid steel frame, padding and covering similar to that of the lower body support and back support. Directly behind each of the arm supports is an arcuate member 15 secured to the frame of the back support, as illustrated by FIG. 1. A stiff, semi-rigid material, such as a thick plastic sheet 17, is stretched over the arcuate members and between the arm supports and the top of the frame of the back support prior to covering of the entire chair with the outer decorative covering, as illustrated by FIG. 5. The end result is a flexible, deflectable wing portion 16 beside each arm which does not need adjustment and allows the operator or technician to get closer to the patient sitting in the chair, if necessary. The wing portions can be deflected inwardly. On release of the deflector pressure, the wing portions will return to their original position due to the stiff material extending from the top of the back support over the arcuate portion 15 directly behind each of the arm supports 14. The rear of the back support includes a slot 18 for insertion of the adjustable headrest assembly to be discussed.

The adjustable headrest assembly is illustrated by FIGS. 2 through 4 and essentially comprises a headrest support frame 39 covered with a padded front portion 40 and a padded rear portion 41 connected by an adjustment mechanism to an elongated support plate 19. The headrest assembly is adjusted vertically relative to the back support by sliding in slot 18. The assembly is held in a desired adjustment position by a friction clamp (not shown). The supporting frame 39 of the headrest support has a center cut-out portion, as illustrated by FIG. 2, allowing the adjustment mechanism to be essentially flush mounted within the headrest assembly.

The adjustment mechanism comprises essentially an elongated, rectangular linking member 21 having bore openings 22 and 23 drilled therethrough at the upper and lower ends, respectively. Slots 24 and 25, cut in the link member 21, as illustrated by FIG. 3, communicate with the bore openings 22 and 23. The slot allows the internal diameter of the bore openings 22 and 23 to be reduced by compression of the linking member 21. A channel 26 is bored at transverse angles through the length of the linking member 21 to receive pin 30. The channel intersects the bore openings 22 and 23 and projects a small distance into the bore openings, as illustrated by FIG. 4. The bore openings 22 and 23 are fitted with pins 27 and 28, having an outer diameter slightly less than the internal diameter of the openings 22 and 23, so that they are free to rotate in the absence of compressive force on the elongated linking member 21, tending to reduce the internal diameter of the bore openings 22 and 23. Pin 27 consists essentially of two separate arcuate segments held in spaced relation by a rod 36 having a width less than the diameter of the pin 27. The rod 36 is secured to the segments by a pivot pin 37 extending through the rod, as illustrated by FIGS. 3 and 4. The pivot pin allows the rod to pivot thereabout between the positions shown in phantom in FIG. 4. The rod 36 is connected by collars 38 to the headrest support frame 39. The headrest can thus be pivoted about the pivot pin 37 to a desired position and locked in place, as will be described.

The lower pin 28 extends beyond the plane of the member 21 on each side and includes a slot extending part way therethrough which receives the forks 42 of support plate 19, as illustrated by FIG. 2. The pin 28 is secured in place to the plate 19 by bolts 43.

Each of the pins 27 and 28 has a central channel 29 cut therein, as illustrated by FIG. 4, of a depth sufficient to allow pin 30 to be inserted through the channel 26. The purpose of the channels 29, in cooperation with pin 30, is to secure the pins 27 and 28 in place in the linking member.

The pin 30, extending through channel 26 and securing the pins 27 and 28 in place, has a threaded portion 31 on the lower end over which is fitted a nut 32. The nut bears against a shoulder cut in the lower end of the linking member 21. The upper end of the pin 30 is pivotally connected to a cam member 34 bearing against a cam surface 33 cut in the upper end of linking member 21. The cam member 34 includes an integral handle 35 movable between the positions illustrated by FIG. 3. In the position shown in solid lines in FIG. 3, the pin in cooperation with the cam surface 34 exerts a compressive force on the respective ends of the linking member 21 compressing and closing the slots 24 and 25. As a result the internal diameter of openings 22 and 23 is reduced so that each frictionally engages the outer surfaces of pins 27 and 28 and prevents their rotation. When the handle 35 is moved to the position shown in phantom in FIG. 3, the compressive force on the linking member 21 is released, allowing the pins 27 and 28 to rotate freely within the bore openings 22 and 23.

The headrest portion of the adjustable headrest assembly can easily be adjusted relative to support plate 19 by moving the handle 35 to the position shown in phantom in FIG. 3 and rotating the headrest about either of the upper or lower pins 27 and 28 and pivoting the headrest about pivot pin 37 as desired. Once the desired position of the headrest is obtained, the operator presses the handle 35 down to the position shown in solid lines in FIG. 3 to lock all the components together and prevent further rotation or movement. The headrest can be adjusted to any desired position very easily and quickly. The adjustment mechanism is flush mounted within the headrest assembly, is simple to operate and is relatively inexpensive to fabricate. The dentist or technician can adjust the patient's head to any desired angle for mouth work or denture work very easily and without complication.

The embodiments of the invention in which an exclusive property or privilege is claimed are defined as follows:

1. An adjustment mechanism linking a head support and means for attachment to the back support of a chair comprising:

an elongated linking member having two parallel annular openings extending therethrough near each end, slots in the linking member extending from the outer surface thereof into communication with each of the annular openings, each of the slots allowing the internal diameter of each of the annular openings to be reduced by compression of the linking member adjacent the slots;

an open-ended channel extending through the linking member essentially transverse to the axis of each of the annular openings and communicating with the slots and a segment of each of the annular openings;

annular pins received in each of the annular openings, each pin having an external diameter slightly less than the internal diameter of the respective annular opening in the uncompressed state, allowing free rotation thereof, each pin having a channel extending around the outer circumference thereof;

means connecting one of the annular pins to the head support and the other annular pin to the means for attachment to the back support;

a pin extending through the open-ended channel of the linking member communicating with the respective channels in the annular pins to retain the annular pins in place in the linking member;

retaining means at one end of the pin to retain the pin in place in the open-ended channel; and cam means connected to the opposite end of the pin for exerting tension on the pin relative to the linking member to compress the linking member, reducing the diameter of the annular openings and frictionally engaging the annular pins to lock them against rotation.

2. The mechanism of claim 1 wherein the annular pin connected to the head support comprises two unconnected arcuate segments and wherein the means connecting the annular pin to the head support is a rod having a width less than the diameter of the annular pin extending between the two segments, the rod pivotally connected to the segments midway between their ends for adjustment of the headrest about the pivotal connection.

3. In a dental chair having a floor support, padded lower body support, arm supports, head support and adjustable back support, the improvement comprising providing flexible wing portions extending from the upper terminating edge of the back support down each side to a point adjacent the rear of each of the arm supports, allowing a dentist or technician closer access to the patient sitting in the chair by deflection of the wing portions and providing an adjustment mechanism for the head support, the mechanism comprising:

an elongated linking member having two parallel annular openings extending therethrough near each end, slots in the linking member extending from the outer surface thereof into communication with each of the annular openings, each of the slots allowing the internal diameter of each of the annular openings to be reduced by compression of the linking member adjacent the slots;

an open-ended channel extending through the linking member essentially transverse to the axis of each of the annular openings and communicating with the slots and a segment of each of the annular openings;

annular pins received in each of the annular openings, each pin having an external diameter slightly less than the internal diameter of the respective annular opening in the uncompressed state, allowing free rotation thereof, each pin having a channel extending around the outer circumference thereof;

means connecting one of the annular pins to the head support and the other annular pin to the means for attachment to the back support;

a pin extending through the open-ended channel of the linking member communicating with the respective channels in the annular pins to retain the annular pins in place in the linking member;

retaining means at one end of the pin to retain the pin in place in the open-ended channel; and cam means connected to the opposite end of the pin for exerting tension on the pin relative to the linking member to compress the linking member, reducing the diameter of the annular openings and frictionally engaging the annular pins to lock them against rotation.

4. The mechanism of claim 3 wherein the annular pin connected to the head support comprises two unconnected arcuate segments and wherein the means connecting the annular pin to the head support is a rod having a width less than the diameter of the annular pin extending between the two segments, the rod pivotally connected to the segments midway between their ends for adjustment of the headrest about the pivotal connection.

*5. In a dental chair including a back support having two sides and a top, and two spaced apart arm supports mounted by the back support adjacent opposite sides thereof, two arm slings respectively associated with the two arm supports, each arm sling comprising:*

*means mounted by the back support adjacent one side thereof, said means extending behind and adjacent the respective arm support for engaging the arms of a patient so as to maintain the patient's arms close to the patient's body while sitting in the chair,*

*said means including a deflectable portion moveable (1) relatively toward the patient from an original position by application of a force directed toward the patient in order to permit close access to the patient while sitting in the chair, and (2) relatively away from the patient unitl resuming said original position upon termination of such force application.*

*6. The dental chair of claim 5, wherein each of said arm slings comprises sling support means secured to and extending from the back support adjacent said respective arm support, and wherein each of said deflectable portions comprises flexible sheet means extending between the sling support means and the back support.*

*7. The chair of claim 6, further comprising a headrest mounted by the back support.*

*8. The chair of claim 7, further comprising means operatively associated with said headrest and the back support for adjusting the position of said headrest with respect to the back support.*

* * * * *